April 21, 1970     C. G. ENFIELD     3,508,148
IN-PLACE SOIL WATER CONDUCTIVITY TESTER
Filed June 21, 1968
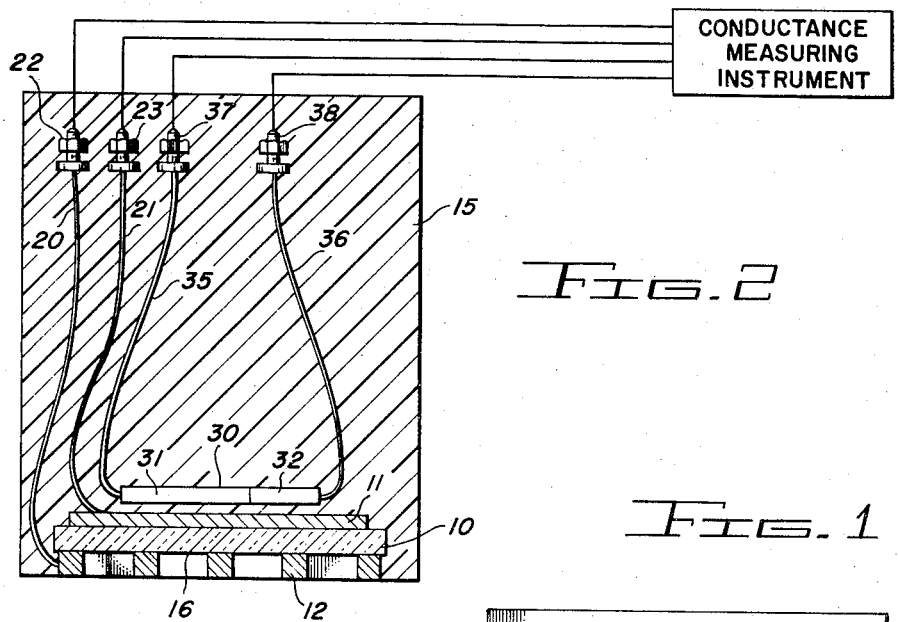
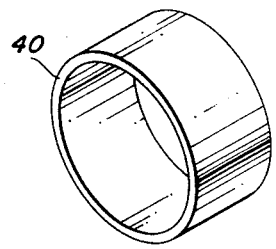
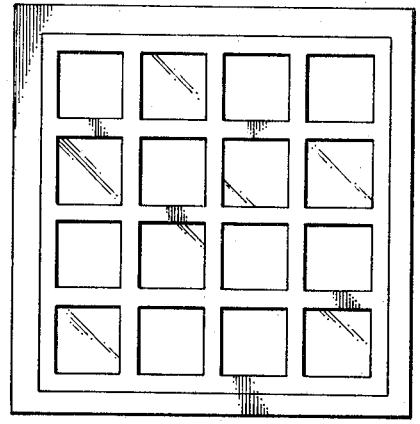
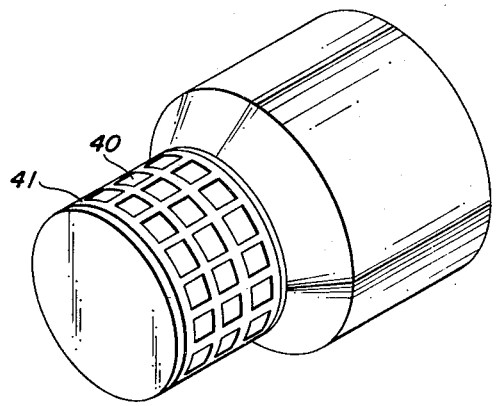
INVENTOR.
CARL G. ENFIELD
BY
*Drummond & Cahill*
ATTORNEYS United States Patent Office 3,508,148
Patented Apr. 21, 1970

3,508,148
IN-PLACE SOIL WATER CONDUCTIVITY TESTER
Carl G. Enfield, Tucson, Ariz., assignor to Burr-Brown Research Corporation, a corporation of Arizona
Filed June 21, 1968, Ser. No. 739,063
Int. Cl. G01r 27/22
U.S. Cl. 324—65                     5 Claims

ABSTRACT OF THE DISCLOSURE

A square porous glass plate having a platinum grid electrode fused to one side thereof and a platinum plate electrode fused to the opposite side thereof. The glass plate and electrodes are enclosed within an electrical insulation material leaving the platinum grid electrode and glass plate visible through the grid electrode exposed. A temperature compensation network is positioned within the insulation material to compensate for the temperature dependency of the soil system being measured.

---

The present invention pertains to soil water conductivity testers, and more particularly, to a soil water conductivity cell.

The determination of salinity and water conductivity is a matter of substantial significance in present-day agriculture. Measurements of this quantity are especially important in those areas where high salt or mineral content is likely to be encountered in the soil water. Prior art techniques usually required soil sampling and the transportation of such samples to a laboratory whereupon the sample was appropriately treated and the water extracted to ascertain the salinity thereof. The apparatus required did not usually permit a rapid field test of the salinity and therefore rendered the entire operation cumbersome and less than satisfactory.

It is therefore an object of the present invention to provide a soil water conductivity tester that may be utilized in the field.

It is another object of the present invention to provide a soil water conductivity tester that may be semi-permanently installed at a predetermined location in the field.

It is still another object of the present invention to provide an in-place soil water conductivity tester that may be placed in the ground and may be connected to conventional instrumentation to measure the conductivity thereof.

These and other advantages of the present invention will become apparent to those skilled in the art as the description thereof proceeds.

Briefly, in accordance with the embodiment chosen for illustration, a porous glass plate is provided with a plate electrode on one side thereof. The opposite side is provided with a grid electrode covering a predetermined percentage of the area of plate surface. Electrical insulation material, such as an epoxy, is utilized to enclose the porous glass plate and plate electrode, but does not cover the grid electrode nor the spaces between the grid electrode elements through which the glass plate is exposed. A temperature compensation network, such as a thermistor, is positioned in the electrical insulation and electrical leads are taken from the compensation network and from the plate and grid electrodes to the exterior of the insulation for connection to an external electrical device.

The present invention may more readily be described by reference to the accompanying drawings, in which:

FIGURE 1 is a bottom view of an in-place soil water conductivity tester constructed in accordance with the teachings of the present invention.

FIGURE 2 is a cross-sectional view of FIGURE 1 taken along line 2—2.

FIGURE 3 is a perspective view of another embodiment of the present invention.

FIGURE 4 is a perspective view of a cylindrical porous glass plate useful in describing the embodiment of FIGURE 3.

Referring now to FIGURES 1 and 2, the in-place soil water conductivity tester of the present invention may have any convenient form; however, a convenient form, such as a cube, is shown in FIGURES 1 and 2. A porous glass plate 10 is provided with a plate electrode 11 on one side surface thereof and provided with a grid electrode 12 on the opposite side surface thereof. Soil water solutions, like other electrolytic solutions, obey Ohm's law:

$$G = K\frac{a}{l}$$

where:

G = Conductance, mhos
a = Cross sectional area of conductor
l = Length of conductor
K = Specific conductance = reciprocal of specific resistance $\rho$ Under prior art measurements, the conductivity was measured by placing two parallel plates of area "a," separated by length "l" and utilizing any conventional conductivity measuring instrument (e.g., bridge-type). To provide an equivalent result, the present invention utilizes the glass plate 10 that becomes and remains saturated with soil water. To enable the glass plate to remain saturated under normal matric capillary suction (i.e., the equivalent negative pressure or suction of the water in soil), the porosity of the glass plate must be controlled within certain experimentally determined limits. For example, it has been found that a suitable porous glass for utilization as the glass plate 10 includes pores having a diameter of 40 angstrom units. The glass exhibits a specific gravity (dry) of 1.5 with a total void space of 28% of the volume. Glass of this porosity yields excellent results and was found to provide a matric suction equivalent to the negative pressure or suction of the water in the soil in which the glass is embedded. The electrodes 11 and 12 are non-corrodible metals highly resistant to attack by normal agricultural earth constituents. It has been found that platinum or platinum-gold performs satisfactorily. For example, the plate electrode 11 may be formed by fusing liquid bright platinum paint to the porous glass at approximately 700° C. Similarly, the grid electrode 12 may be attached by screen printing the grid from Du Pont Platinum-Gold Paste 7553 and fusing the electrode to the porous glass at approximately 700° C.

The porous glass plate 10 and electrodes 11 and 12 are embedded in an epoxy casing 15. Numerous types of encapsulating materials may be utilized; however, it has been found that the commercial product known as RTV most closely approximates the thermal expansion characteristics of the remainder of the device and therefore appears to be most suitable. The encapsulating material does not cover the grid electrode 12 nor does it cover the exposed surfaces 16 of the plate 10. Conductors 20 and 21 are connected to the grid electrode 12 and the plate electrode 11 respectively and extend through the encapsulating material to terminals 22 and 23 respectively.

In aqueous solutions, conductivity of ions present in the soil system varies approximately 2% per degree centigrade. Conductivity relations in agriculture are generally based on an equivalent conductivity at 25° C.; therefore, a temperature compensating network 30 is placed in the encapsulating material for the purpose of automatically adjusting readings to an equivalent reading at 25° C. The temperature compensating network 30 may be appropriately adjusted by utilizing a temperature dependent electrical element such as a thermistor 31 connected to a resistor 32, the temperature co-efficients of which are selected to provide the appropriate 2% per degree centigrade change in the conductivity tested. Electrical conductors 35 and 36 are connected to the temperature compensating network 30 and extend through the encapsulating material to terminate in terminals 37 and 38 respectively.

In use, the cube-shaped in-place soil water conductivity tester, such as shown in FIGURES 1 and 2, is placed in the ground at a desired location. Leads are connected to the terminals 22, 23, 37, and 38 and extend out of the ground for connection to an appropriate instrument. The device is buried, usually at a depth of approximately six to eight inches or more and must be left in the ground approximately eight hours to reach steady state conditions. The time necessary to reach steady state conditions depends on such variables as glass thickness. The time may be shortened by utilizing a thinner glass plate; heowever, it has been found that eight hours is adequate for a porous glass plate of approximately 1 millimeter thickness. Also, sufficient current may be derived from a glass plate of 2 centimeters square and having a grid electrode covering approximately 60% of the surface of the plate. Conventional circuits may be utilized to measure the conductivity of the porous glass plate after it has reached steady state conditions as described above. AC measuring devices for measuring conductance have been found to be most appropriate and the change in resistance provided by the temperature compensation network at ground temperature may conveniently be utilized to alter the ultimate conductance so that the value of conductance will automatically be adjusted to conductance at 25° C.

The device may subsequently be disconnected from the conductance measuring instrument and left in the soil for extended periods of time. In this manner, changes in conductance at that particular field location may accurately be measured since the precise location of the measuring instrument will remain the same from test to test.

The embodiment shown in FIGURES 3 and 4 utilizes identical elements; however, the porous glass plate 40 is formed into a cylinder and the grid electrode 41 and plate electrode (not shown) are similarly formed into cylindrical form. The physical form of the in-place soil water conductivity tested of FIGURES 3 and 4 has been found convenient to use but utilizes identical elements operating in the identical fashion as that described in connection with FIGURES 1 and 2.

It will be obvious to those skilled in the art that numerous modifications may be made in the specific elements combined in the embodiment chosen for illustration. For example, other metals besides gold or platinum may be used to form the electrodes and a variety of temperature compensating networks may be used chosen from numerous well-known arrangements. It will also be apparent to those skilled in the art that the conductance measuring instrument, such as that schematically shown in FIGURE 2, may take any of the variety of commercially available products. It is therefore intended that the present invention be limited only by the scope of the claims appended hereto.

What is claimed is:

1. An in-place soil water conductivity tester comprising: a porous glass plate having first and second side surfaces and edge surfaces connecting said side surfaces wherein said porous glass plate includes pores having diameters in the range of ten to one hundred angstrom units; a first metallic electrode in intimate contact with and covering less than 100% of said first side surface to expose a predetermined proportion of said first side surface through said first electrode; a second metallic electrode in intimate contact with said second side surface; electrical insulation material enclosing and insulating said second side surface and second electrode, and said edge surfaces; first and second electrical conductors connected to said first and second electrodes respectively, and extending through said electrical insulation for connection to an external electrical conductivity measuring circuit.

2. The combination set forth in claim 1 including a temperature dependent electrical element positioned in said insulation material having electrical conductors connected thereto extending through said electrical insulation material for connection to an external electrical circuit, said temperature dependent electrical element having a predetermined temperature co-efficient.

3. The combination set forth in claim 1 wherein said first metallic electrode is formed into a grid.

4. The combination set forth in claim 2 wherein said temperature dependent electrical element is a thermistor.

5. The combination set forth in claim 1 wherein said first metallic electrode is formed into a grid and wherein said first and second electrodes are substantially non-corrodible metals.

References Cited

UNITED STATES PATENTS

| | | |
|---|---|---|
| 2,526,636 | 10/1950 | Colman. |
| 2,636,962 | 4/1953 | Bouyoucos _____ 324—65 X |
| 2,804,593 | 8/1957 | Estienne _____ 324—65 |
| 3,181,098 | 5/1965 | Richards. |
| 3,258,682 | 6/1966 | Maurer _____ 324—30 |

RUDOLPH V. ROLINEC, Primary Examiner

C. F. ROBERTS, Assistant Examiner

U.S. Cl. X.R.

324—30